(12) United States Patent
Onoda

(10) Patent No.: US 8,493,471 B2
(45) Date of Patent: Jul. 23, 2013

(54) IMAGING APPARATUS, RECORDING APPARATUS, FILE MANAGEMENT APPARATUS AND DISPLAY APPARATUS

(75) Inventor: Senichi Onoda, Osaka (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 12/692,769

(22) Filed: Jan. 25, 2010

(65) Prior Publication Data

US 2010/0188527 A1 Jul. 29, 2010

(30) Foreign Application Priority Data

Jan. 26, 2009 (JP) ................................. 2009-013997

(51) Int. Cl.
*H04N 5/76* (2006.01)
(52) U.S. Cl.
USPC ..................................... 348/231.3; 348/231.2
(58) Field of Classification Search
USPC .................... 348/207.1, 231.99, 231.2, 231.3
See application file for complete search history.

(56) References Cited

FOREIGN PATENT DOCUMENTS

| JP | 2005-260662 | | 9/2005 |
|---|---|---|---|
| JP | 2005260662 A | * | 9/2005 |
| JP | 2006-080781 | | 3/2006 |

* cited by examiner

*Primary Examiner* — Timothy J Henn
(74) *Attorney, Agent, or Firm* — Panasonic Patent Center

(57) ABSTRACT

An imaging apparatus includes an image generation unit operable to generate image signal of a subject, a recording unit operable to record a first type of image file or a second type of image file to a recording medium based on the image signal generated by the image generation unit, and a controller operable to control the recording unit. The controller controls the recording unit to record the first type of image file at a lower level of a first directory in the recording medium and record the second type of image file at a lower level of a second directory in the recording medium, and record in the recording medium information used to analyze a recording order of the first type of image file and the second type of image file in the recording medium, while relating the information to the second type of image file.

18 Claims, 13 Drawing Sheets

Fig. 6

| Tag (8b) | Flag (8b) | DirNo (16b) | FileNo (16b) | MakerInformation (Mark-0) (128b) | Reserved (80b) |

"100" → DirNo

"0001" → FileNo

Fig. 10A

| Tag (8b) | Flag (8b) | DirNo (16b) | FileNo (16b) | MakerInformation (Mark-0) (128b) | Reserved (80b) |

"100" → DirNo
"0001" → FileNo

Fig. 10B

| Tag (8b) | Flag (8b) | DirNo (16b) | FileNo (16b) | MakerInformation (Mark-1) (128b) | Reserved (80b) |

"100" → DirNo
"0004" → FileNo

Fig. 12A

| Tag (8b) | Flag (8b) | DirNo (16b) | FileNo (16b) | MakerInformation (Mark-0) (128b) | Reserved (80b) |

"100" ← DirNo
"0001" ← FileNo

Fig. 12B

| Tag (8b) | Flag (8b) | DirNo (16b) | FileNo (16b) | MakerInformation (Mark-1) (128b) | Reserved (80b) |

"101" ← DirNo
"0003" ← FileNo

IMAGING APPARATUS, RECORDING APPARATUS, FILE MANAGEMENT APPARATUS AND DISPLAY APPARATUS

BACKGROUND

1. Technical Field

The technical field relates to an imaging apparatus, a recording apparatus, a file management apparatus, and a display apparatus that can handle two types of files.

2. Related Art

JP2005-260662A discloses a multimedia data generating method. The multimedia data generating method stores at least two types of multimedia data (e.g., still image files and moving image files) having different compression formats in different directories provided for each compression format, in a data accumulation apparatus. When at least first multimedia data is stored, a link file associated with the first multimedia data is created in a directory where second multimedia data is generated.

The multimedia data generating method can solve a disadvantage caused by image files being not arranged in chronological order in digital cameras and digital video cameras that store still image files and moving image files in different directories. For example, in general PC's file browsing software, a disadvantage that it is difficult to figure out the recording order of still image files and moving image files can be solved. In addition, according to the multimedia data generating method, a directory in which moving image files are stored is not used to store image files, profiles and the like of other standards. In this manner, without influencing moving image files and other products, compatibility with the DCF (Design Rule for Camera File system) standard can be maintained.

However, in the multimedia data generating method described in JP2005-260662A, when the link file is deleted on a personal computer and the like, it is difficult to arrange images based on still image files and images based on representative images of moving image files in recording order. In addition, the link file needs to be deleted upon deletion of the corresponding still image file. For example, when in playback mode a still image file is searched for based on a link file and a corresponding still image file does not exist, the link file needs to be deleted. Moreover, in the multimedia data generating method described in JP2005-260662A, since a link file needs to be separately added to a directory which stores moving images, inconvenience occurs that, for example, files that are not defined by the AVCHD (Advanced Video Codec High Definition) standard need to be created in a folder defined by the AVCHD standard.

To solve the above-described problems, an imaging apparatus, a recording apparatus, a file management apparatus, and a display apparatus are provided, which can store images of different types which conform to a plurality of standards and that can identify recording order between image files of different standards (types).

SUMMARY

In a first aspect, an imaging apparatus is provided which includes an image generation unit operable to generate image signal of a subject, a recording unit operable to record a first type of image file or a second type of image file to a recording medium based on the image signal generated by the image generation unit, and a controller operable to control the recording unit. The controller controls the recording unit to record the first type of image file at a lower level of a first directory in the recording medium and record the second type of image file at a lower level of a second directory in the recording medium, and record in the recording medium information used to analyze a recording order of the first type of image file and the second type of image file in the recording medium, while relating the information to the second type of image file.

In a second aspect, a recording apparatus is provided, which includes a recording unit operable to record information conforming to a first standard at a lower level of a first directory in a recording medium and record information conforming to a second standard at a lower level of a second directory in the recording medium, and a controller operable to control the recording unit. The controller controls the recording unit to generate association information for associating a recording order of the information conforming to the first standard with a recording order of the information conforming to the second standard, and to record the association information in the recording medium.

In a third aspect, a file management apparatus is provided, which includes a recording unit operable to record information in a recording medium, and a controller operable to control the recording unit. The controller controls the recording unit to record a first type of file at a lower level of a first directory in the recording medium and record a second type of file at a lower level of a second directory in the recording medium, and record in the recording medium information used to analyze a recording order of the first type of file and a recording order of the second type of file in the recording medium, while relating the information to the second type of file.

In a fourth aspect, a display apparatus is provided, which extracts information from a recording medium that stores first information conforming to a first standard and second information conforming to a second standard and displays the information. The recording medium stores association information for associating a recording order of the first information with a recording order of the second information. The display apparatus includes a display unit operable to display the first information and/or the second information, and a controller operable to cause the display unit to display the first information and the second information in mixture, based on the association information.

In a fifth aspect, a computer readable recording medium is provided, which is encoded with instructions for causing a computer to operate as a file management apparatus. The file management apparatus includes a recording unit operable to record information in a recording medium, and a controller operable to control the recording unit. The controller controls the recording unit to record a first type of file at a lower level of a first directory in the recording medium and record a second type of file at a lower level of a second directory in the recording medium, and record in the recording medium information used to analyze a recording order of the first type of file and a recording order of the second type of file in the recording medium, while relating the information to the second type of file.

According to the above aspects, information used to analyze the order in which a first type of file (or a file conforming to a first standard) and a second type of file (or a file conforming to a second standard) are recorded in a recording medium is recorded in the recording medium so as to be associated with the second type of file (or the file conforming to the second standard). In this manner, an effect is obtained that images based on two types of files (or different standards) can be easily displayed so as to be arranged in recording order. In addition, since information about the recording order of two types of files is achieved without creating new files, there is no need to newly add files that are not defined by the standard(s).

BRIEF DESCRIPTION OF DRAWINGS

FIG. 6 is a diagram showing a first example of a configuration of MakerInformation.

FIG. 10A is a diagram showing a second example of the configuration of MakerInformation.

FIG. 10B is a diagram showing the second example of the configuration of MakerInformation.

FIG. 12A is a diagram showing a third example of the configuration of MakerInformation.

FIG. 12B is a diagram showing the third example of the configuration of MakerInformation.

DETAILED DESCRIPTION OF PREFERRED EMBODIMENTS

A digital camera according to an embodiment will be described below with reference to the accompanying drawings.

1. Configuration

Figure 1A:
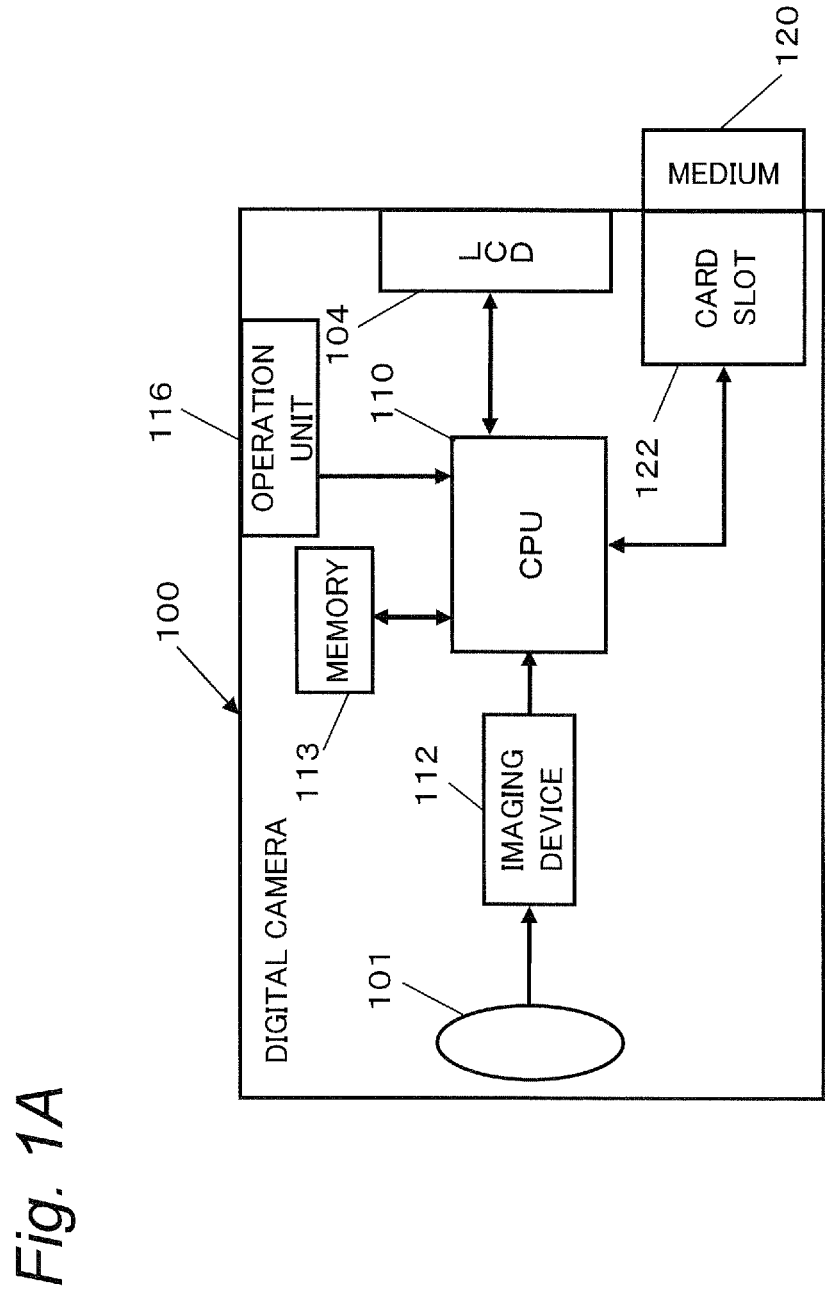
FIG. 1A is a diagram showing a configuration of a digital camera according to an embodiment.
Figure 1C:
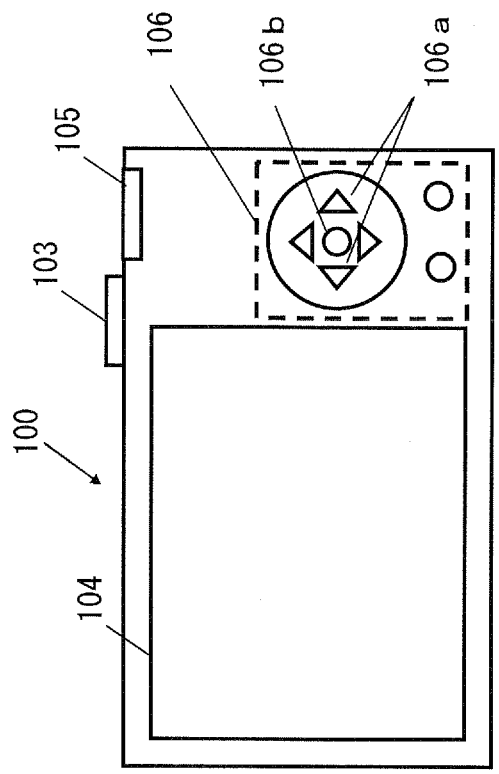
FIG. 1C is a rear view of the digital camera according to the embodiment.
Figure 1B:
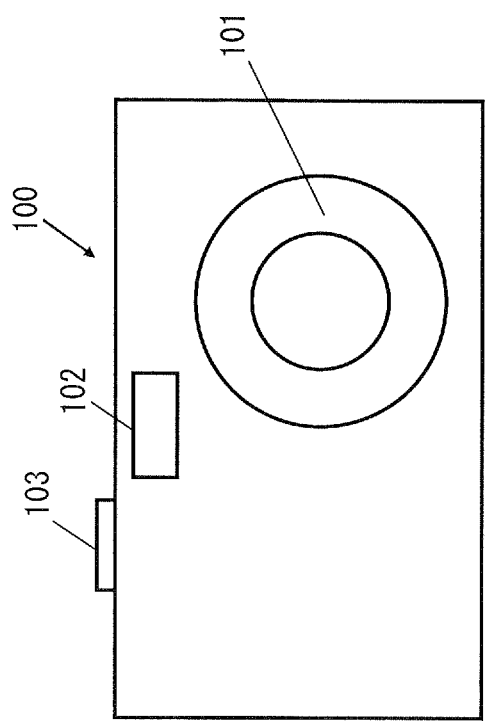
FIG. 1B is a front view of the digital camera according to the embodiment.

FIG. 1A is a diagram showing a configuration of a digital camera according to the embodiment. FIG. 1B is a front side view of the digital camera and FIG. 1C is a rear side view of the digital camera.

As shown in FIG. 1A, a digital camera 100 includes an optical system 101, an imaging device 112, a CPU 110, a liquid crystal display (LCD) 104, an operation unit 116, and a card slot 122. The optical system 101 includes lenses. The imaging device 112 includes a CCD, CMOS sensor or the like, and converts an optical signal inputted through the optical system 101 to an electrical signal. The operation unit 116 includes a shutter button and various operation buttons. The card slot 122 can allow a recording medium 120 such as a memory card to be inserted thereinto, and writes and reads image data to/from the recording medium 120. The recording medium 120 stores still image data or moving image data recorded by the digital camera 100. The liquid crystal display 104 displays a still image, a moving image, operation information and the like. The CPU 110 controls the overall operation of the digital camera 100. Operations of the digital camera 100 which will be described below can be implemented by the CPU 110 executing a predetermined control program. A memory 113 stores information (a control program and other information) required for the CPU 110 to perform control.

As shown in FIG. 1B, on the front side of the digital camera 100, the optical system 101 and a flash 102 are arranged. The optical system 101 forms a subject image on the imaging device 112 in the digital camera 100. The flash 102 emits flash light to compensate for the shortage of the amount of light for recording, when recording is performed in a dark place in still image recording mode.

On the top side of the digital camera 100, a shutter button 103 is arranged. When the shutter button 103 is pressed in still image recording mode, image data based on a subject image which is formed on the imaging device 112 through the optical system 101 is recorded in the recording medium 120 as a still image file. When the shutter button 103 is pressed in moving image recording mode, image data based on a subject image which is formed on the imaging device 112 is sequentially recorded in the recording medium 120 as a moving image file. When the shutter button 103 is pressed again, the recording of the moving image file ends.

As shown in FIG. 1C, on the rear side of the digital camera 100, the liquid crystal display 104, a mode dial 105, and various operation buttons 106 are arranged. On the liquid crystal display 104, an image based on a subject image which is formed on the imaging device 112 is displayed. Thus, a user can determine a composition for recording while observing an image displayed on the liquid crystal display 104. The liquid crystal display 104 can also display a still image based on a still image file or a moving image based on a moving image file which is recorded in the recording medium 120.

The operating mode of the digital camera 100 can be determined by operating the mode dial 105. The digital camera 100 has, as operating modes, a still image recording mode, a moving image recording mode, and a playback mode.

The still image recording mode is an operating mode which can record image data based on a subject image which is formed on the imaging device 112 in the recording medium 120 as a still image file by pressing the shutter button 103. The still image recording mode is subdivided into a fully automatic recording mode, a program recording mode, a shutter speed priority recording mode, an aperture priority recording mode, and a scene-matching recording mode. In still image recording mode, still image files are recorded in the recording medium 120 in conformity with the DCF standard.

The moving image recording mode is an operating mode which can sequentially record image data based on a subject image which is formed on the imaging device 112 in the recording medium 120 as a moving image file from when the shutter button 103 is pressed until the shutter button 103 is pressed again. In the moving image recording mode, a moving image file is recorded in the recording medium 120 in conformity with the AVCHD standard.

The playback mode is an operating mode which can display a still image based on a still image file which is recorded in the recording medium 120 or a moving image based on a moving image file which is recorded in the recording medium 120 on the liquid crystal display 104. In the playback mode, thumbnails based on still image files and thumbnails based on representative images of moving image files can also be displayed together on the liquid crystal display 104 so as to be arranged in the order in which images are recorded. When a thumbnail based on the still image file displayed on the liquid crystal display 104 is selected by the user, a still image based on the still image file associated with the selected thumbnail is displayed on the liquid crystal display 104. When a thumbnail based on a representative image of a moving image file is selected, a moving image based on the moving image file associated with the selected thumbnail is played back.

By operating the various operation buttons 106, more detailed settings can be performed in still image recording mode, moving image recording mode, or playback mode. For example, in the still image recording mode, settings of exposure correction, white balance adjustment, light emission of the flash 102, and so on can be performed. In the moving image recording mode, resolution and frame rate can be changed. In the playback mode, zoom-in or zoom-out of a still image displayed on the liquid crystal display 104, a setting of the number of thumbnails displayed at one time on the liquid crystal display 104, a search for a still image file or a moving image file recorded in the recording medium 120, and so on can be performed.

1.1 Display of Image Files

Figure 2:
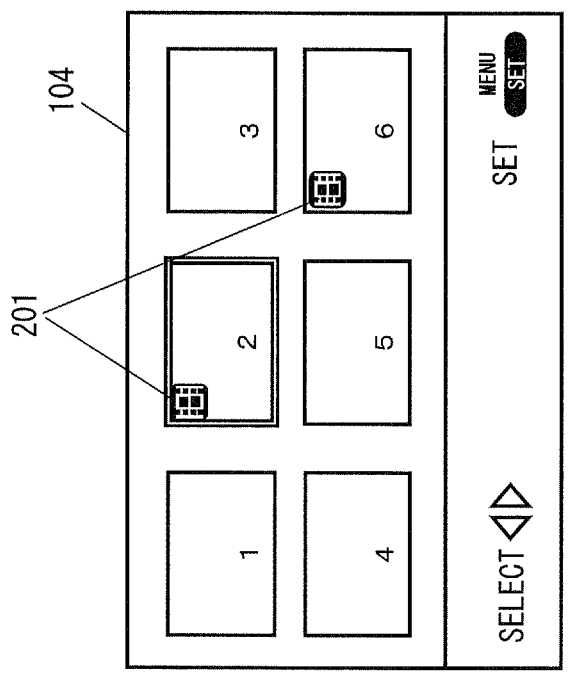
FIG. 2 is a diagram showing a state in which thumbnails are displayed in recording order on a liquid crystal display (LCD).

FIG. 2 is a diagram showing a state in which thumbnails are displayed on the liquid crystal display 104 in order of recording date and time.

Thumbnails 1 to 6 are displayed so as to be arranged in order of recording date and time from oldest to newest. The thumbnails 1 and 3 to 5 are based on still image files and the thumbnails 2 and 6 are based on representative images of moving image files. On the upper left of each of the thumbnails 2 and 6 based on representative images of moving image files, an icon 201 indicating that the thumbnail is based on a representative image of a moving image file is superimposed on the thumbnail and displayed.

By pressing a left/right button 106a in the various operation buttons 106, any one of the thumbnails 1 to 6 can be selected. FIG. 2 shows a state in which the thumbnail 2 based on a representative image of a moving image file is selected. When the right button of the left/right button 106a is further pressed with the thumbnail 6 based on a representative image of a moving image file being selected, another six thumbnails which follow the thumbnails 1 to 6 in chronological order are displayed on the liquid crystal display 104. In this manner, every six thumbnails based on still image files or on representative images of moving image files which are recorded in the recording medium 120 are displayed so that any one of them can be selected.

When, with any thumbnail being selected, a MENU/SET button 106b in the various operation buttons 106 is pressed, if the selected thumbnail is one based on a still image file then a still image based on the still image file is displayed on the liquid crystal display 104, and if the selected thumbnail is one based on a representative image of a moving image file then a moving image based on the moving image file is played back.

1.2 Directory Structure

Figure 3:
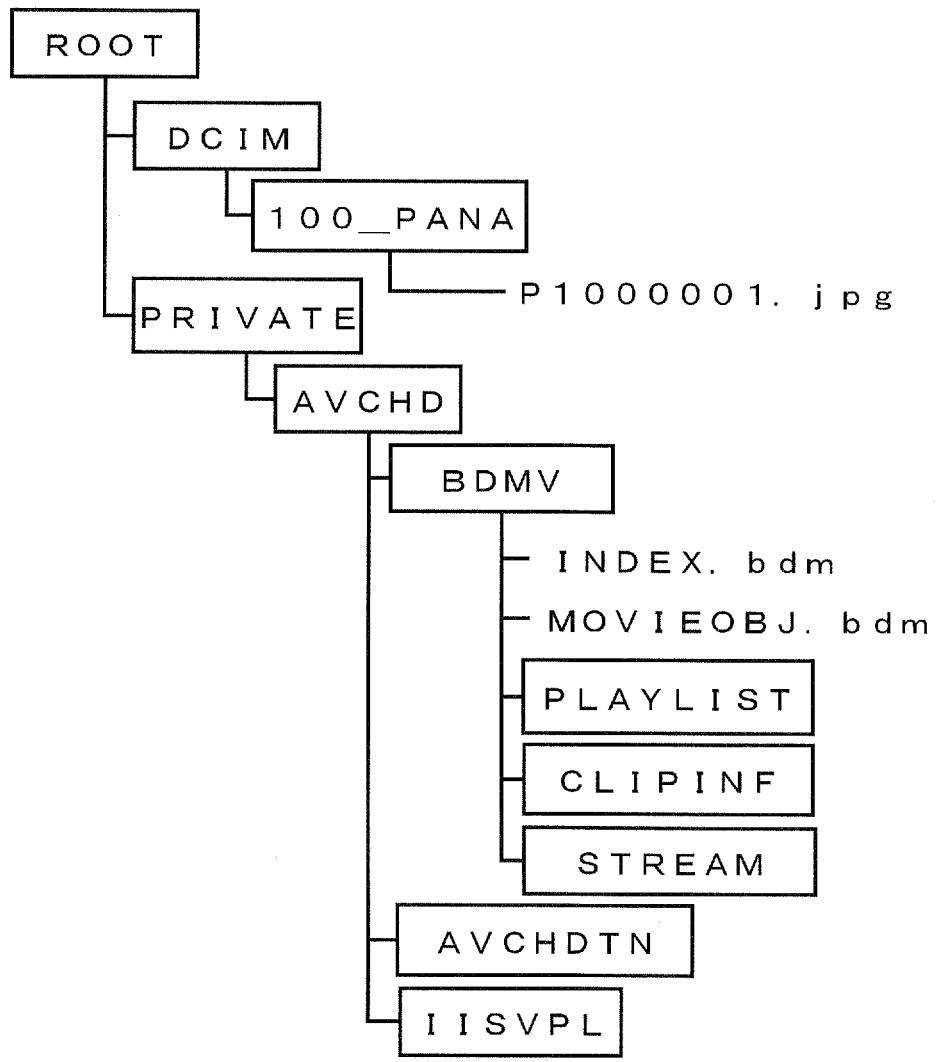
FIG. 3 is a diagram showing a first example of a directory configuration (folder configuration) of a recording medium such as a memory card.

FIG. 3 is a diagram showing a first example of a directory configuration (folder configuration) of the recording medium 120 of the digital camera 100. A character string enclosed in a box indicates a directory name (folder name) and a character string that is not enclosed in a box indicates a file name.

ROOT is the top-most directory in a directory configuration created in a recording medium such as a memory card. Creation of directories and recording of still image files, moving image files, and other files are performed from this level.

DCIM is a directory (folder) defined by the DCF standard. "100_PANA" is a directory for recording still image files and is created at a level below DCIM. The DCF standard defines that a directory name of a directory for storing still image files is composed of a 3-digit number from 100 to 999 and five free characters. In the present embodiment, as the five free characters, "_PANA" is used. FIG. 3 shows an example in which "100" is used as the 3-digit number and "_PANA" is used as the five free characters. Note that a 3-digit number included in a directory name is incremented with the creation of a directory for recording still image files. The 3-digit number is hereinafter referred to as the "directory number".

P1000001.jpg which is recorded at a level below "100_PANA" is a still image file. It is defined by the DCF standard that a file name of a still image file is composed of four free characters and a 4-digit number from 0001 to 9999. In the present embodiment, as the four free characters, a combination of the character "P" and a 3-digit number which is used in a directory name of a directory in which still image files are stored is used. FIG. 3 shows an example in which "P100" is used as the four free characters and "0001" is used as the 4-digit number. Note that a 4-digit number composing a file name is incremented with the recording of a still image file. The 4-digit number is hereinafter referred to as the "DCF file number".

FIG. 3 shows a state in which only one still image file named "P1000001.jpg" is recorded at the level below 100_PANA. When in this state next still image recording is performed, a still image file named "P1000002.jpg" is recorded at the level below 100_PANA. Thereafter, still image files named "P1000003.jpg", "P1000004.jpg", are recorded in chronological order.

Note that, when the number of still image files recorded at the level below 100_PANA reaches 9999, 101_PANA which is a new directory for recording still image files is created at the level below DCIM. Also, even when the number of still image files recorded at the level below 100_PANA does not reach 9999, 101_PANA which is a new directory for recording still image files can be created at the level below DCIM.

At a level below 101_PANA, firs, a still image file named "P1010001.jpg" is recorded and thereafter still image files named "P1010002.jpg", "P1010003.jpg", . . . , are recorded in order of recording date and time. As is the case with 100_PANA, when the number of still image files recorded at the level below 101_PANA reaches 9999, 102_PANA which is a new directory for recording still image files is created at the level below DCIM. Also, even when the number of still image files recorded at the level below 101_PANA does not reach 9999, 102_PANA which is a new directory for recording still image files can be created at the level below DCIM. Thereafter, likewise, a new directory for recording still image files is created in accordance with an increase in still image files.

Note that in the digital camera 100 according to the present embodiment the CPU 110 stores the latest directory number and DCF file number in its built-in memory, and when a still image file is recorded a directory name and a file name which are used to store the still image file are determined by referring to such information read from the memory.

PRIVATE is a directory for recording files other than still image files. The directory AVCHD is created at a level below PRIVATE. AVCHD is a directory defined by the AVCHD standard. BDMV, AVCHDTN, and IISVPL directories are created at a level below the directory AVCHD.

BDMV is a directory for recording INDEX.bdm for storing index information and MOVIEOBJ.bdm for storing movie objects. Either one of INDEX.bdm and MOVIEOBJ.bdm is recorded at a level below BDMV. PLAYLIST is a directory for recording playlist files and is created at the level below the directory BDMV. CLIPINF is a directory for recording clip information files and is created at the level below the directory BDMV. STREAM is a directory for recording moving image files and is created at the level below the directory BDMV.

AVCHDTN and IISVPL are directories for recording files required to control playback of a moving image file and are created at the level below the directory AVCHD.

In FIG. 3, only one still image file named "P1000001.jpg" is recorded at the level below 100_PANA and no moving image files are recorded. Therefore, there is no file at respective lower levels of the directories PLAYLIST, CLIPINF, and STREAM.

2. Operations

The operations of the digital camera 100 according to the present embodiment will be described with reference to FIGS. 4 to 11. Note that the digital camera 100 records in the recording medium 120 still image files in conformity with the DCF standard and moving image files in conformity with the AVCHD standard.

Figure 4:
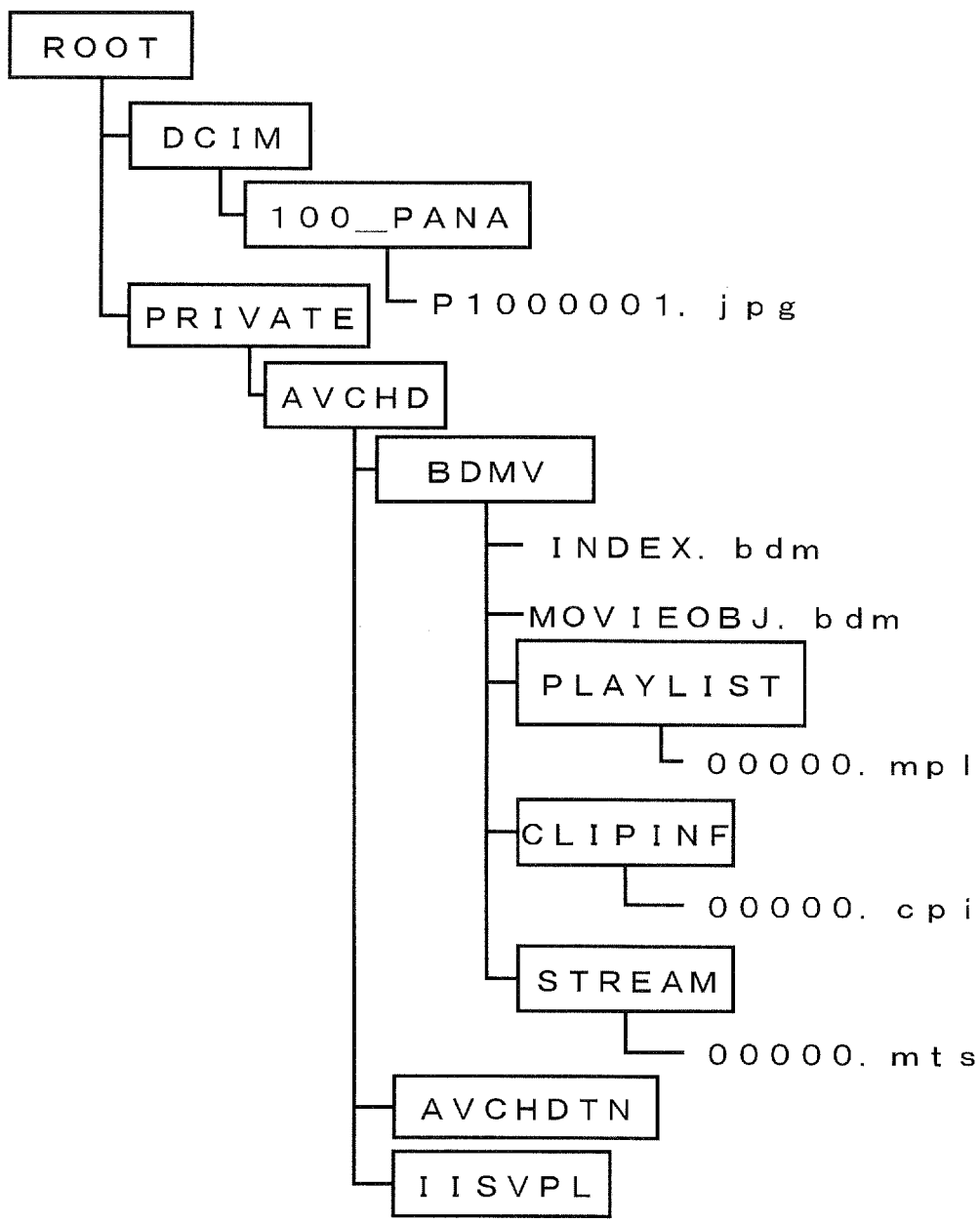
FIG. 4 is a diagram showing a second example of the directory configuration of the recording medium such as a memory card.

Operations performed when the digital camera 100 records a moving image file in the recording medium 120 will be described with reference to FIG. 4. FIG. 4 is a diagram showing a second example of the directory configuration of the recording medium 120. Specifically, FIG. 4 shows a state in which one moving image file (00000.mts) is further recorded in the state shown in FIG. 3.

As shown in FIG. 4, when the CPU 110 of the digital camera 100 newly records one moving image file (00000.mts), the CPU 110 stores index information in INDEX.bdm and stores a movie object in MOVIEOBJ.bdm.

In addition, when the CPU 110 newly records a moving image file, the CPU 110 records clip information file at the level below CLIPINF. The clip information file stores information which is referred to when special playback such as fast forward is performed. The clip information file corresponds to a moving image file. In FIG. 4, the clip information file named "00000.cpi" is recorded at the level below CLIPINF.

In addition, when the CPU 110 newly records a moving image file, the CPU 110 records a moving image file at the level below STREAM. In the moving image file, data in which video data and audio data are multiplexed is stored. The moving image file corresponds to a clip information file. In FIG. 4, a stream file named "00000.mts" is recorded at the level below STREAM.

In addition, when the CPU 110 newly records a moving image file, the CPU 110 records a playlist file at the level below PLAYLIST. The playlist file stores a moving image file managed by a playlist and information that defines association information which is associated with the stream file. The playlist file is created, for example, on every date a moving image is recorded, and manages the moving images, but is not limited thereto. In FIG. 4, a playlist file named "00000.mpl" is recorded at the level below PLAYLIST.

Figure 5:
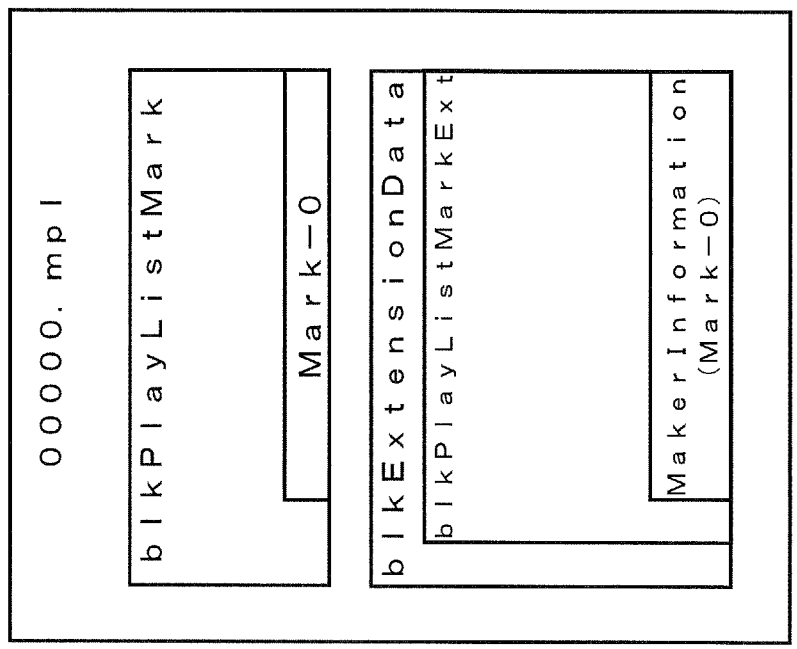
FIG. 5 is a diagram showing a first example of a configuration of a playlist file.

The configuration of a playlist file will be described with reference to FIG. 5. FIG. 5 is a diagram showing a part of the configuration of 00000.mpl which is a playlist file present in the directory state shown in FIG. 4.

As shown in FIG. 5, in the playlist file, areas called blkPlayListMark and blkExtensionData are provided. In addition to them, information such as TypeIndicator is included and they conform to the AVCHD standard. In blkPlayListMark, the same number of pieces of information about Marks as the number of Marks managed by the corresponding playlist are recorded. In the example shown in FIG. 5, 00000.mpl manages one Mark and a block where information about the Mark is recorded is represented by Mark-0. Note that an ID of playItem which indicates the entire 00000.mts as a moving image file is recorded in Mark-0, and Mark is associated with the moving image file.

blkExtensionData is an extended area in which information about the playlist other than information defined by the AVCHD standard is recorded, and the AVCHD standard defines a format thereof.

MakerInformation in blkPlayListMarkExt is an area that can be freely used by a maker and can record maker-specific information. Particularly, in the present embodiment, MakerInformation includes information for identifying a file name assigned to a still image file which is recorded immediately after the recording of a moving image file associated with a Mark managed by blkPlayListMark, and a directory name of a directory which stores the still image file. This is detailed later. In FIG. 5, MakerInformation (Mark-0 of Mark) includes information for identifying a file name assigned to a still image file which is recorded immediately after the recording of a moving image file associated with Mark-0 managed by blkPlayListMark, and a directory name of a directory which stores the still image file.

The configuration of MakerInformation will be described with referenced to FIG. 6. FIG. 6 shows the configuration of MakerInformation (Mark-0) of a playlist file in the state shown in FIG. 5. Each numerical value in parentheses indicates the number of bits assigned to a corresponding area. The CPU 110 records information in MakerInformation in a manner described below.

MakerInformation is divided into areas named Tag, Flag, DirNo, FileNo, and Reserved. Tag stores a tag ID, and Flag stores various flags. Reserved is an area for future use.

A part (directory number) of a directory name of a directory which would store a still image file if the still image file were recorded immediately before performing moving image recording is stored in DirNo by the CPU 110. For example, in the example shown in FIGS. 4 to 6, if a still image is recorded immediately before recording the moving image file "00000.mts", it is determined that the still image file is to be stored in the directory "100_PANA" (see FIG. 4). Thus, as shown in FIG. 6, the directory number "100" is stored in DirNo. Note that if the number of bits assigned to DirNo is sufficiently large, then the entire directory name may be stored. That is, provided that a directory name of a directory for recording a still image file of a next still image to be recorded can be identified by referring to DirNo, other information may be stored in DirNo.

The CPU 110 stores, in FileNo, a value obtained by subtracting 1 from a DCF file number which is assigned to a still image file of a next still image to be recorded. In the example shown in FIGS. 4 to 6, the still image file of a still image recorded recently is "P1000001.jpg" and the DCF file number thereof is "0001". Hence, a DCF file number assigned to a still image file of the next still image to be recorded is "0002". Accordingly, as shown in FIG. 6, the value "0001" obtained by subtracting 1 from "0002" is stored in FileNo. Note that if the bit number assigned to FileNo is sufficiently large, then the entire file name assigned to a next still image file to be recorded may be stored in FileNo. That is, provided that a chronological relationship of recording order between a still image file and a moving image file can be grasped by referring to FileNo and DirNo, other information may be stored in FileNo.

As described above, by referring to DirNo, a directory name of a directory for storing a still image file of a next still image to be recorded can be identified when a moving image is recorded. Furthermore, by referring to FileNo and DirNo, a file name of a still image file of a next still image to be recorded can be identified when a moving image is recorded. Accordingly, the CPU 110 can identify still image file before which a moving image file is recorded, and thus can display thumbnails based on still image files together with thumbnails based on representative images of moving image files on the liquid crystal display 104 such that the thumbnails are arranged chronologically in order of recording.

A method of identifying a chronological relationship of recording order of image files by referring to DirNo and FileNo will be described below. The CPU 110 identifies a directory name of a directory where a still image file is stored, by referring to DirNo. The CPU 110 also obtains a DCF file number by adding 1 to a value stored in FileNo and identifies a file name of the still image file from the obtained file number and DirNo. Then, the CPU 110 determines that a moving image file associated with MakerInformation is recorded before recording the identified still image file.

For example, in the case of the example in FIGS. 4 to 6, "0001" is stored in FileNo of MakerInformation (Mark-0) corresponding to the moving image file "00000.mts" and "100" is stored in DirNo, respectively. The CPU 110 identifies the directory name "100_PANA" of a directory where a still image file is stored, by referring to DirNo "100". The CPU 110 also obtains the DCF file number "0002" by adding 1 to "0001" stored in FileNo, and identifies the file name "P1000002.jpg" of the still image file from the DCF file number and DirNo "100". Then, the CPU 110 determines that the moving image file associated with MakerInformation (Mark-0) is recorded before recording the identified still image file ("100_PANA/P1000002.jpg").

Note that FIG. 6 shows the configuration of MakerInformation for the case in which a moving image file is newly recorded in a state in which a still image file is already recorded. When a moving image file is recorded in a state in which no still image file is recorded, i.e., when a moving image file is the first one to be recorded, the CPU 110 stores "100" in DirNo and stores "0000" in FileNo. According to the DCF standard, since "P0000000.jpg" cannot exist as a file name of a still image file, the CPU 110 can determine that the moving image file is recorded earlier than the still image file "100_PANA/P1000001.jpg", by referring to DirNo "100" and FileNo "0000".

When a still image file identified by referring to FileNo is deleted and does not exist in the recording medium 120 or when a still image file is not recorded after recording a moving image file and does not exist in the recording medium 120, the CPU 110 determines that the moving image file is recorded before a still image file having a file name including a file number obtained by adding 1 to a file number of a file name of the identified still image file. When the still image file identified in the aforementioned manner does not exist in the recording medium 120, is determined that the moving image file is recorded chronologically last in the directory identified by DirNo. Note that specific examples of the method of determining a chronological relationship of recording order will be described later.

Furthermore, when a still image file does not exist at a level below a directory for storing the still image file which is to be recorded immediately after performing moving image recording, it is determined that recording order is located at the top in the directory for recording the still image file which is to be recorded immediately after performing moving image recording.

When a directory identified by referring to DirNo is deleted and does not exist, the CPU 110 determines that the moving image file is recorded after a still image file having a file name (DCF file number) which is the greatest in a directory having a directory name (directory number) which is smaller by one than the directory name (directory number) identified by referring to DirNo. Furthermore, when the directory having the directory name which is smaller by one than the identified directory name is also deleted and does not exist, the CPU 110 determines that the moving image file is recorded after a still image file having a file name which is the greatest in a directory having a directory name which is smaller by two than the directory name identified by referring to DirNo.

With the above-described method, even when a still image file or a directory which is identified based on FileNo and/or DirNo is deleted and does not exist, a chronological relationship of recording order of still image files and moving image files can be identified and thus thumbnails based on still image files and thumbnails based on representative images of moving image files can be arranged together in recording order and displayed on the liquid crystal display 104. When a moving image file is deleted and does not exist, information about Mark associated with the deleted moving image file is deleted from a playlist file according to the AVCHD standard. With the deletion, the corresponding MakerInformation is also deleted so that there is no trouble in arranging in recording order thumbnails based on still image files and thumbnails based on representative images of moving image files together and displaying them on the liquid crystal display 104.

In the digital camera 100 according to the present embodiment, a part of a directory name of a directory to which a still image file to be recorded immediately after the recording of a moving image is recorded is stored in DirNo and a part of a file name of the still image file is stored in FileNo. However, the method is not limited thereto. For example, since according to the DCF standard, a file name of a still image file is uniquely determined independent of the number of directories for storing still image files, only a file name of a still image file or a part of the file name of the still image file excluding a fixed character string may be stored in a predetermined area of MakerInformation. In a word, any method can be used as long as a file name of a still image file to be recorded immediately after the recording of a moving image can be identified. Although in the present embodiment a directory number and a file number of a still image file to be recorded immediately after the recording of a moving image are recorded in MakerInformation, a directory number and a file number of a still image file recorded immediately before the recording of a moving image may be recorded. Although in the present embodiment a directory number and a file number of a still image file to be recorded immediately after the recording of a moving image are recorded in MakerInformation, the directory number and the file number may be recorded in another extended area defined by the AVCHD standard. Also, not the file number obtained immediately after the recording of a moving image but any file number conforming to the DCF standard may be recorded in MakerInformation. In this manner, files conforming to the DCF standard and files conforming to the AVCHD standard can be rearranged in any order instead of in chronological order.

3. EXAMPLES

Specific examples of the operation of determining a chronological relationship between recording dates and times of image files for various directory configurations will be described below with reference to the accompanying drawings.

3.1 First Example

Figure 7:
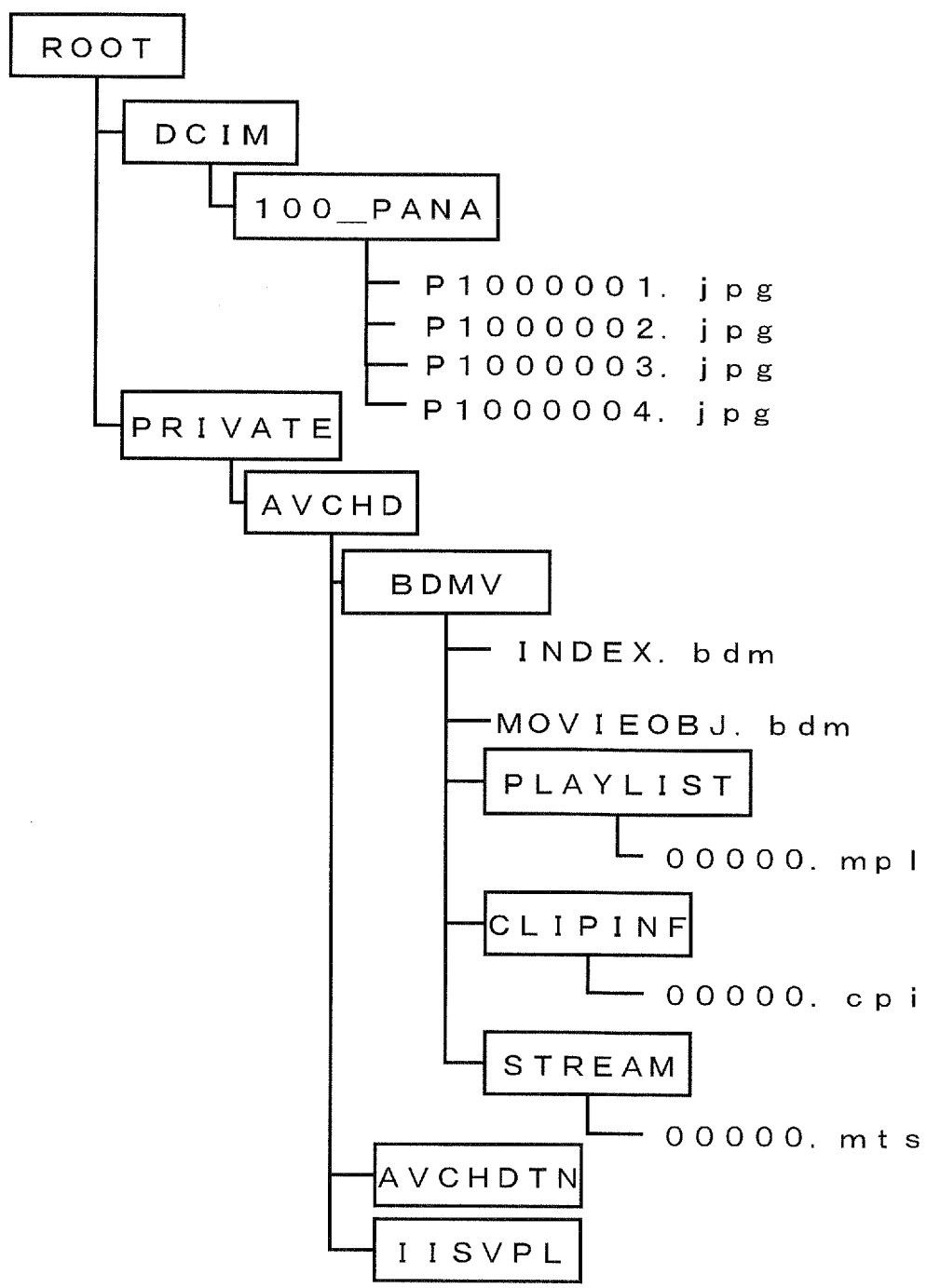
FIG. 7 is a diagram showing a third example of the directory configuration of the recording medium such as a memory card.
Figure 8:
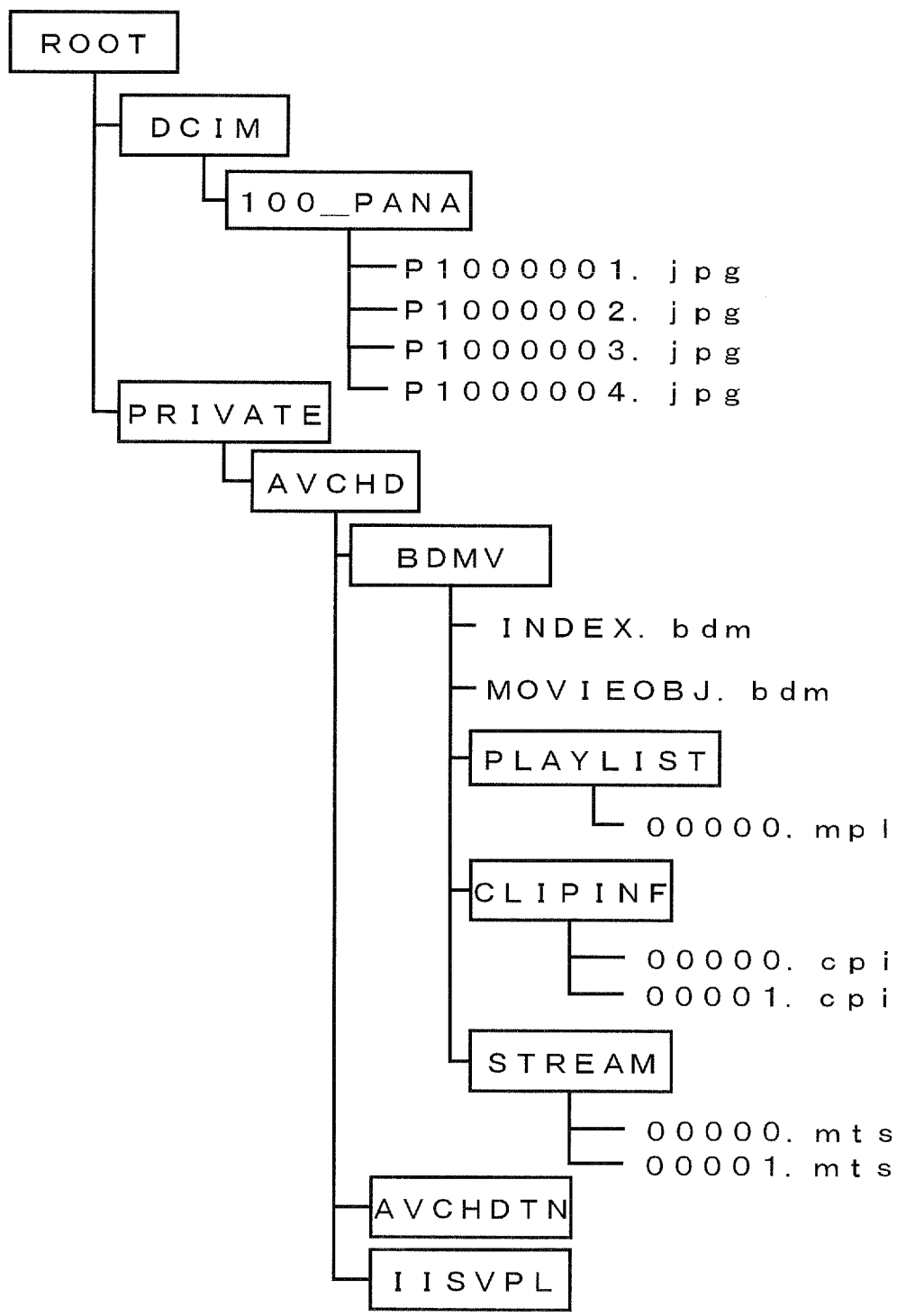
FIG. 8 is a diagram showing a fourth example of the directory configuration of the recording medium such as a memory card.

FIG. 7 is a diagram showing a third example of the directory configuration of the recording medium 120. FIG. 7 shows a state in which three still image files (P1000002.jpg to P1000004.jpg) are further recorded in the state shown in FIG. 4. FIG. 8 is a diagram showing a fourth example of a directory configuration created in the recording medium 120. FIG. 8 shows a state in which one moving image file (00001.mts) is further recorded in the state shown in FIG. 7.

At the level below PLAYLIST, there is a playlist file named "00000.mpl".

In FIG. 8, at the level below CLIPINF a clip information file named "00001.cpi" is newly recorded. At the level below STREAM, a moving image file named "00001.mts" is newly recorded.

Figure 9:
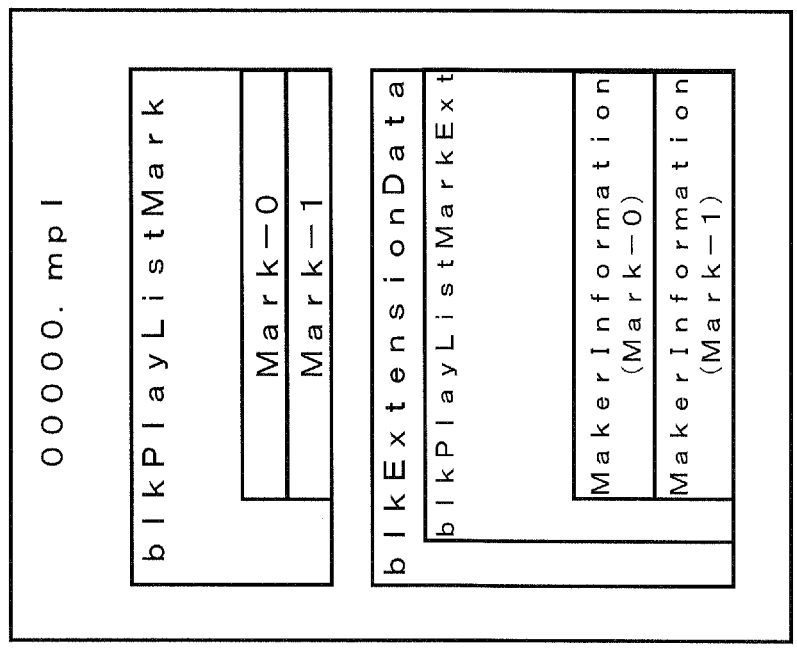
FIG. 9 is a diagram showing a second example of the configuration of a playlist file.

FIG. 9 is a diagram showing a configuration of the playlist file (00000.mpl) in the directory configuration shown in FIG. 8.

In FIG. 9, in blkPlayListMark, Mark-1 associated with 00001.mts which is a new moving image file is newly added. Also, in blkPlayListMarkExt, MakerInformation (Mark-1) associated with Mark-1 in blkPlayListMark is added.

FIG. 10A shows a configuration of MakerInformation (Mark-0) in the state shown in FIG. 9, and FIG. 10B shows a configuration of MakerInformation (Mark-1) in the state shown in FIG. 9.

Referring to FIG. 10A, "100" is stored in DirNo of MakerInformation (Mark-0) and "0001" is stored in FileNo. By referring to these pieces of information, it can be determined that a moving image file corresponding to Mark-0 (00000.mts) is recorded immediately before P1000002.jpg as a still image file.

Referring to FIG. 10B, "100" is stored in DirNo of MakerInformation (Mark-1) and "0004" is stored in FileNo. By referring to these pieces of information, it can be determined that a moving image file corresponding to Mark-1 (00001.mts) is recorded before P1000005.jpg as a still image file.

From the above, it can be seen that the first moving image Mark-0 (00000.mts) is recorded immediately before recording the second still image file "P1000002.jpg" and thereafter the second to fourth still image files "P1000002.jpg" to "P1000004.jpg" are recorded. Also, it can be seen that the second moving image Mark-1 (00001.mts) is recorded immediately before recording the fifth still image file "P1000005.jpg".

Note that if in FIG. 8 the still image file "P1000002.jpg" does not exist, the CPU 110 would determine that Mark-0 (00000.mts) is recorded immediately before the still image file "P1000003.jpg" having a file number which is the second greatest after "P1000002.jpg". Also, since the example in FIG. 8 shows a state before the still image file P1000005.jpg is recorded and there is no still image file having a file number greater than P1000005.jpg, it is determined that Mark-1 (00001.mts) is located at the end.

Accordingly, as shown in FIG. 2, thumbnails based on still image files and thumbnails based on representative images of moving image files can be arranged in recording order and displayed in mixture on the liquid crystal display 104. In addition, since information about the recording order of still image and moving image files is provided without creating new files, there is no need to newly add files that are not defined by the standard(s).

3.2 Second Example

Figure 11:
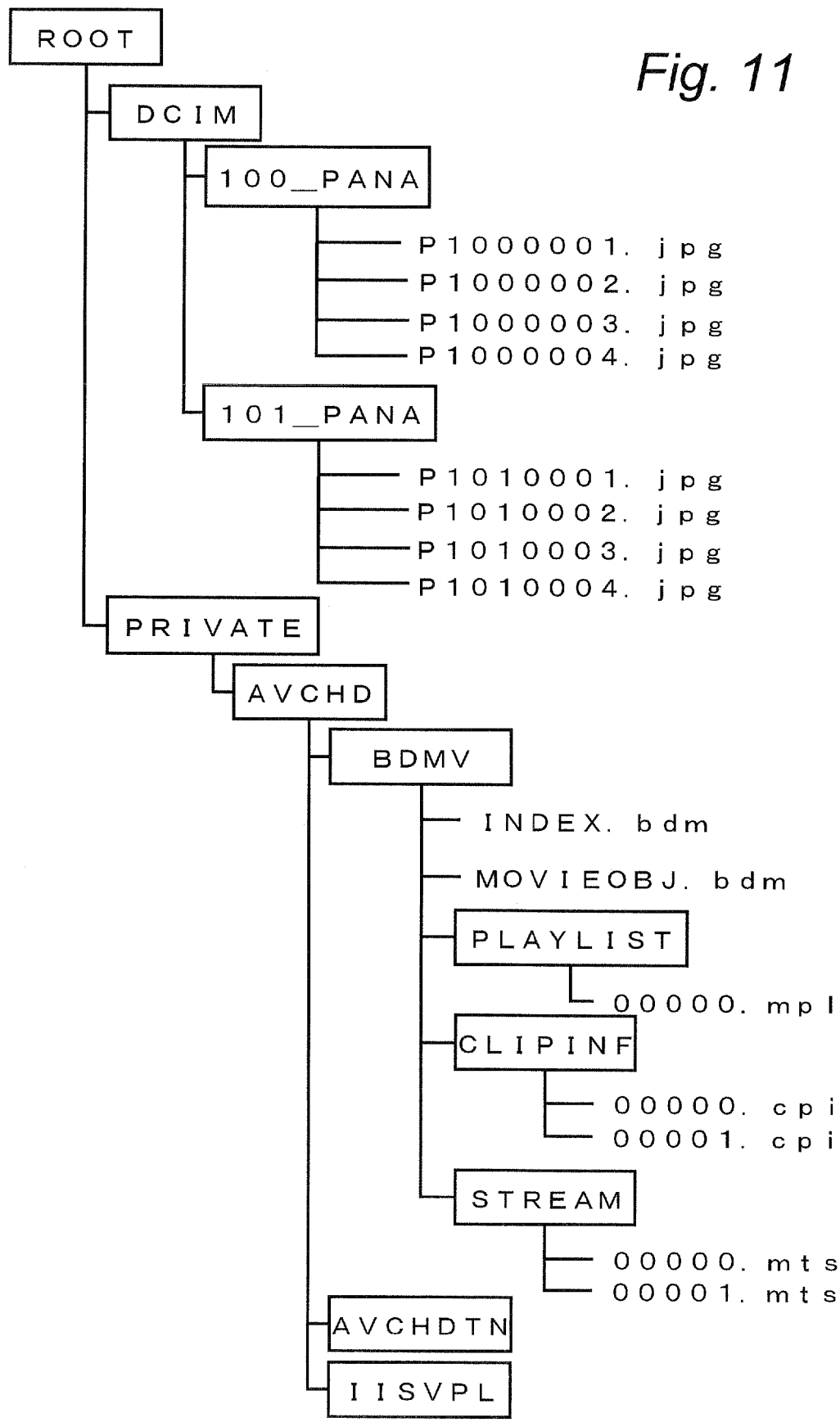
FIG. 11 is a diagram showing a fifth example of the directory configuration of the recording medium such as a memory card.

Next, an example of the case in which there are a plurality of directories for recording still image files is shown. FIG. 11 is a diagram showing a fifth example of the directory configuration of the recording medium 120.

In FIG. 11, there are 100_PANA and 101_PANA as directories for recording still image files. At a level below 100_PANA, P1000001.jpg to P1000004.jpg as still image files are recorded. At a level below 101_PANA, P1010001.jpg to P1010004.jpg as still image files are recorded. Two moving image files are managed by one playlist file and a file name of the playlist file is 00000.mpl. The configuration of the playlist file "00000.mpl" is as shown in FIG. 9.

FIG. 12A shows a configuration of MakerInformation (Mark-0) in the directory configuration shown in FIG. 11, and FIG. 12B shows a configuration of MakerInformation (Mark-1) in the directory configuration shown in FIG. 11. Mark-0 corresponds to the moving image file "00000.mts" and Mark-1 corresponds to the moving image file "00001.mts", respectively.

Referring to FIG. 12A, "100" is stored in DirNo of MakerInformation (Mark-0) and "0001" is stored in FileNo. Based on these pieces of information, it can be determined that a moving image file corresponding to Mark-0 (00000.mts) is recorded immediately before the still image file P1000002.jpg which is recorded at the level below 100_PANA which is a directory for recording still image files.

Referring to FIG. 12B, "101" is stored in DirNo of MakerInformation (Mark-1) and "0003" is stored in FileNo. Based on these pieces of information, it can be determined that a moving image file corresponding to Mark-1 (00001.mts) is recorded immediately before the still image file P1010004.jpg which is recorded at the level below 101_PANA which is a directory for recording still image files.

From the above, it can be seen that to arrange chronologically and display cn the liquid crystal display 104 thumbnails based on still image files and thumbnails based on representative images of moving image files, the thumbnails need to be displayed in the following order.

1) Thumbnail based on P1000001.jpg
2) Thumbnail based on a representative image of Mark-0 (00000.mts)
3) Thumbnail based on P1000002.jpg
4) Thumbnail based on P1000003.jpg
5) Thumbnail based on P1000004.jpg
6) Thumbnail based on P1010001.jpg
7) Thumbnail based on P1010002.jpg
8) Thumbnail based on P1010003.jpg
9) Thumbnail based on a representative image of Mark-1 (00001.mts)
10) Thumbnail based on P1010004.jpg In the case of a combination of conditions shown in FIGS. 10A, 10B, and 11, it can be determined that the moving image file corresponding to Mark-0 (00000.mts) is recorded immediately before the still image file "P1000002.jpg" which is recorded at the level below the directory "100_PANA". Also, it can be determined that the moving image file corresponding to Mark-1 (00001.mts) is recorded immediately before the still image file "P1000005.jpg" which is recorded at the level below the directory "100_PANA". However, in FIG. 11, since the still image file "P1000005.jpg" does not exist, it is determined that the moving image file "00001.mts" is recorded between the still image file "P1000004.jpg" which is the newest file in the 100_PANA directory and the still image file "P1010001.jpg" which is the oldest file in the 101_PANA directory next to the 100_PANA directory.

Note that, when there are a plurality of Marks (moving image files) whose values of DirNo and FileNo in MakerInformation are equal, the recording order can be determined as follows. Specifically, Marks (moving image files) are arranged in ascending order of file number which is assigned in a playlist file which manages a plurality of Marks. Furthermore, when the file numbers which are assigned in the playlist file are equal, it is determined that Mark (moving image file) which is recorded higher in the playlist file is recorded earlier. Note that the method is not limited thereto and any other method can be used as long as Marks (moving image files) can be arranged in a unique order.

When there is Mark of which values of DirNo and FileNo in MakerInformation are invalid, that is, Mark including DirNo other than 100 to 999 and/or FileNo other than 0000 to 9999 for FileNo, the following method is used. Marks having invalid values of DirNo and FileNo are arranged all together, in accordance with file numbers which are assigned in the playlist file and recording locations in the playlist file, after or before valid jpg files and a list obtained by arranging Marks having valid values of DirNo and FileNo in MakerInformation by the aforementioned method.

In this manner, by using the idea of the present embodiment, without adding a file other than those files defined by the AVCHD standard for managing moving images and the DCF standard for managing still images, information for arranging moving images and still images in recording order can be recorded in conformity with the standards. Conventionally, when moving images and still images are arranged in recording order by referring to recording dates and times defined by the AVCHD standard and the DCF standard, it needs to analyze files conforming to the DCF standard for the still images, and it needs to analyze files conforming to the AVCHD standard for the moving images. However, in the case of the present embodiment, for still images, only a file name conforming to the DCF standard is used and thus an analysis of the DCF standard file is not required. Accordingly, there is an effect that in consumer devices, such as digital cameras, whose CPU's processing capacity is not so high comparing with personal computers and the like, a process of arranging moving images and still images in recording order can be finished within a practical period of time.

Note that throughout the specification the terms "immediately before" and "immediately after" do not refer to the degree of temporal proximity but refer to the order of occurrence of events. Note also that needless to say a recording medium is not limited to a removable recording medium such as a memory card but also includes a memory included in the digital camera 100.

DCIM is an example of a first directory. AVCHD is an example of a second directory. A still image file created in conformity with the DCF standard is an example of a first type of file. A moving image file created in conformity with the AVCHD standard is an example of a second type of file. MakerInformation is an example of association information. A controller can be implemented by a CPU and a program that causes the CPU to run. A card slot is an example of a recording unit. A memory card is an example of a recording medium and is not limited to a removable recording medium as described above.

4. Others

In the present embodiment, description is made using a digital camera as an example. However, the idea of the present embodiment is not limited to an application of a recording apparatus such as a digital camera and a digital video camera. For example, the idea of the present embodiment can also be applied to a display apparatus such as a photo viewer. In the case of a display apparatus, the recording date and time of a still image file and a moving image file recorded in a recording medium such as a memory card may be checked. Based on the check result, a part of a directory name of a directory for recording a still image file which is recorded immediately before recording a moving image may be stored in DirNo of corresponding MakerInformation. Then, a value obtained by subtracting 1 from a part of a file name of a still image file which is recorded immediately after recording the moving image may be stored in FileNo of MakerInformation associated with the moving image. By performing such operation once, thumbnails based on still image files and thumbnails based on representative images of moving image files can be arranged in chronological order and be displayed. In a word, the idea of the present embodiment can be applied to an apparatus that handle both still images and moving images. Accordingly, the idea of the present embodiment can be applied not only to photo viewers but also to a television apparatus and the like. Furthermore, the idea of the present embodiment can be applied to a file management apparatus that handles not only a still image and a moving image but also different types of files.

Moreover, the idea of the present embodiment can be embodied as a file management program to be used in information processing apparatuses such as personal computers.

Industrial Applicability

According to the embodiment, still image files and moving image files can be easily arranged in chronological order and displayed. Thus, the embodiment can be usefully applied to a recording apparatus such as a digital camera and a digital video camera, a display apparatus such as a photo viewer and a television apparatus, and an information processing apparatus such as a personal computer.

What is claimed is:

1. An imaging apparatus comprising:
an image generation unit operable to generate image data of a subject;
a recording unit operable to record a first type of image file or a second type of image file to a recording medium based on the image data generated by the image generation unit, the second type of image file being recorded in the recording medium along with a management file in conformity with a predetermined standard; and
a controller operable to control the recording unit,
wherein the controller controls the recording unit to record the first type of image file at a lower level of a first directory in the recording medium and record the second type of image file at a lower level of a second directory in the recording medium, and record, in the management file, information used to analyze a recording order of the first type of image file and the second type of image file in the recording medium, while relating the information to the second type of image file.

2. The imaging apparatus according to claim 1, wherein the information used to analyze the recording order is information that identifies the first type of image file.

3. The imaging apparatus according to claim 1, wherein the first type of image file and the second type of image file are created based on different standards.

4. A recording apparatus comprising:
a recording unit operable to record first information conforming to a first standard at a lower level of a first directory in a recording medium and record second information conforming to a second standard along with a management file in conformity with the second standard at a lower level of a second directory in the recording medium; and
a controller operable to control the recording unit,
wherein the controller controls the recording unit to generate association information for associating a recording order of the first information conforming to the first standard with a recording order of the second information conforming to the second standard, and to record the association information in the management file.

5. The recording apparatus according to claim 4, wherein the association information is recorded in conformity with at least one of the first standard and the second standard.

6. The recording apparatus according to claim 5, wherein the association information includes a file name of the information conforming to the first or second standard which is recorded in the recording medium.

7. The recording apparatus according to claim 6, wherein the association information includes a directory number assigned to a directory name in conformity with the first standard and includes a file number assigned to a file name in conformity with the first standard, the directory number and the file number being associated with a file defined by the second standard.

8. The recording apparatus according to claim 7, wherein the directory number and the file number are numbers based on a directory number and a file number that are assigned next in conformity with the first standard when the file defined by the second standard is recorded.

9. The recording apparatus according to claim 4, wherein the first standard is a DCF (Design Rule for Camera File System) standard and the second standard is an AVCHD (Advanced Video Codec High Definition) standard.

10. A file management apparatus comprising:
a recording unit operable to record information in a recording medium; and
a controller operable to control the recording unit,
wherein the controller controls the recording unit to record a first type of file at a lower level of a first directory in the recording medium and record a second type of file along with a management file in conformity with a predetermined standard at a lower level of a second directory in the recording medium, and record, in the management file, information used to analyze a recording order of the first type of file and the second type of file in the recording medium, while relating the information to the second type of file.

11. The file management apparatus according to claim 10, wherein the information used to analyze the recording order is information that identifies the first type of file.

12. The file management apparatus according to claim 10, wherein the first type of file and the second type of file are created based on different standards.

13. A display apparatus that obtains and displays information from a recording medium that stores first information conforming to a first standard and second information conforming to a second standard, the recording medium storing a management information which includes association information for associating a recording order of the first information with a recording order of the second information, the display apparatus comprising:

a display unit operable to display at least one of the first information and the second information; and
a controller operable to read the association information from the management file and cause the display unit to display the first information and the second information, based on the association information.

14. The display apparatus according to claim 13, wherein the association information is recorded in conformity with the second standard.

15. The display apparatus according to claim 14, wherein the association information includes a directory number assigned to a directory name in conformity with the first standard and includes a file number assigned to a file name in conformity with the first standard, the directory number and the file number being associated with a file defined by the second standard.

16. The display apparatus according to claim 15, wherein the controller is further operable to:
arrange the first information according to an order of the directory number and the file number which are assigned in conformity with the first standard,
determine a recording order of the first information and the second information based on the directory number and the file number which are included in the association information, and
display the first information and the second information on the display unit by inserting the second information between the first information based on the determined recording order.

17. The display apparatus according to claim 13, wherein the first standard is a DCF (Design Rule for Camera File System) standard and the second standard is an AVCHD (Advanced Video Codec High Definition) standard.

18. A non-transitory computer readable recording medium comprising:
computer executable code operable to cause a computer to operate as a file management apparatus including a recording unit operable to record information in a recording medium, and a controller operable to control the recording unit, wherein
the controller controls the recording unit to record a first type of file at a lower level of a first directory in the recording medium and record a second type of file at a lower level of a second directory in the recording medium, the second type of file being recorded in the recording medium along with a management file in conformity with a predetermined standard, and record, in the management file, information used to analyze a recording order of the first type of file and the second type of file in the recording medium, while relating the information to the second type of file.

* * * * *